US012096125B1

United States Patent
Knox

(10) Patent No.: US 12,096,125 B1
(45) Date of Patent: Sep. 17, 2024

(54) HIGH-SPEED AND HIGH-RESOLUTION WIDE FIELD SCANNING OPTICS

(71) Applicant: Oceanit Laboratories, Inc., Honolulu, HI (US)

(72) Inventor: Allister Knox, Wailuki, HI (US)

(73) Assignee: Oceanit Laboratories, Inc., Honolulu, HI (US)

(*) Notice: Subject to any disclaimer, the term of this patent is extended or adjusted under 35 U.S.C. 154(b) by 280 days.

(21) Appl. No.: 17/548,286

(22) Filed: Dec. 10, 2021

Related U.S. Application Data

(60) Provisional application No. 63/123,832, filed on Dec. 10, 2020.

(51) Int. Cl.
*H04N 23/698* (2023.01)
*G02B 26/10* (2006.01)
*G03B 17/17* (2021.01)
*H04N 23/667* (2023.01)
*H04N 23/695* (2023.01)

(52) U.S. Cl.
CPC ........... *H04N 23/698* (2023.01); *G02B 26/10* (2013.01); *G03B 17/17* (2013.01); *H04N 23/667* (2023.01); *H04N 23/695* (2023.01)

(58) Field of Classification Search
CPC .. H04N 23/698; H04N 23/667; H04N 23/695; G02B 26/10
See application file for complete search history.

(56) References Cited

U.S. PATENT DOCUMENTS

| | | | | |
|---|---|---|---|---|
| 6,072,639 A | * | 6/2000 | Onda | G02B 7/102 359/702 |
| 2006/0062427 A1 | * | 3/2006 | Burkhart | H04N 1/0402 382/100 |
| 2006/0067672 A1 | * | 3/2006 | Washisu | G02B 15/145 396/351 |
| 2008/0088719 A1 | * | 4/2008 | Jacob | H04N 23/56 348/241 |
| 2014/0362177 A1 | * | 12/2014 | Dunn | G03B 17/17 348/37 |
| 2018/0082144 A1 | * | 3/2018 | Wakamatsu | H04N 23/695 |
| 2019/0149710 A1 | * | 5/2019 | Cope | H04N 23/685 348/146 |

* cited by examiner

*Primary Examiner* — Kathleen V Nguyen
(74) *Attorney, Agent, or Firm* — Fresh IP PLC; Clifford D. Hyra; Aubrey Y. Chen

(57) ABSTRACT

The present invention is generally directed to methods, devices, and systems for the acquisition of high-resolution, low-latency imagery over a large area of interest. Specifically, at least one embodiment of the invention includes a wide field optical sensor having a turret, base, and camera. The camera further includes a focal plane array (FPA) with pixels arranged in rows and columns. Additionally, the turret may include a motion controller and a fold mirror with its own motion controller that enables the fold mirror to oscillate (i.e., rotate back and forth) about an axis. The wide field optical sensor may also have at least three modes of operation: (1) a "search mode," which continuously acquires high-resolution images over some field of regard, (2) a "stare mode," which acquires images of the same, fixed region, and (3) an "agile mode," which alternates between the aforementioned two modes.

18 Claims, 14 Drawing Sheets

HIGH-SPEED AND HIGH-RESOLUTION WIDE FIELD SCANNING OPTICS

CROSS-REFERENCE TO RELATED APPLICATIONS

This application claims priority to U.S. Provisional Application No. 63/123,832, filed Dec. 10, 2020, which is hereby incorporated by reference in its entirety.

STATEMENT REGARDING FEDERALLY SPONSORED RESEARCH OR DEVELOPMENT

The invention described herein was made with U.S. government ("Government") support under Contract No. N68335-16-G-0028, awarded by the U.S. Naval Air Warfare CTR Aircraft Division. As a result, the Government has certain rights in this invention.

FIELD OF THE INVENTION

The application relates generally to methods, devices, and systems for wide field optical sensing. In particular, the application relates to the acquisition of high-resolution imagery over a large area of interest.

BACKGROUND

Many optical sensing applications require observation of a large scene area or field of regard (FOR). Examples include, but are not limited to, threat detection and characterization (e.g., of missiles, drones, aircraft, and the like), situational awareness, and border security.

Wide field optical sensors currently known in the art include (1) cameras combined with wide field of view (WFOV) optics, (2) scanning systems, employing a camera and movable mirror to acquire a series of images over the FOR, (3) gimbal systems, where the entire camera is rotated to acquire images of the FOR and (4) multi-camera systems, i.e., multiple cameras arranged with slightly overlapping fields of view.

However, there are challenges in using any of the aforementioned sensing solutions to obtain high-resolution images over a large scene area. For instance, cameras combined with WFOV optics provide wide coverage but lack needed resolution for long-range optical sensing. The only known, currently available way to simultaneously provide high resolution and wide coverage is to acquire multiple, narrow field of view (NFOV) images over the area of interest, either by sweeping the camera over the scene (scanning systems, gimbals), or by using multiple NFOV cameras. Each of these methods have drawbacks; known scanners and gimbals have low scan rates and are unsuitable for observing rapidly changing scenes (missile threats etc.) and multi-camera systems are impractical for most applications, as these require multiple (NFOV) sensors, resulting in a high overall cost, higher overall system size and weight, and increased power requirements.

Given the foregoing, there exists a significant need for novel methods, devices, and systems for rapidly acquiring high resolution imagery over a large area of interest.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In general, the present disclosure is directed towards novel methods, devices, and systems for the acquisition of high-resolution imagery over a large area of interest. Embodiments of the disclosure comprise: a base and camera; and a rotating turret with a motion compensating fold mirror. Additional embodiments may comprise prisms, pellicles, and/or other light-directing objects.

In at least one embodiment, the turret and fold mirror are configured to rotate about the optical axis and direct scene energy to the camera (i.e., act as a periscope). In some embodiments, the turret rotates at a substantially constant rate, and the motion compensating fold mirror rotates back and forth with respect to the turret (i.e., cyclic motion). The fold mirror motion may be represented by two components—a rotational component imparted by the turret and an oscillating (accelerated) component with respect to the turret. With each fold mirror cycle the camera field of view is moved by a discrete angle and is briefly held stationary—i.e., the combined motions of the turret and fold mirror present the camera with a series of stationary scenes, spaced over a field of regard. This is sometimes referred to as step-stare scanning. The camera acquires at least one image during a given stationary period. The above process may be performed repeatedly to acquire a substantially contiguous series of high-resolution images, over a field of regard (FOR). A specific object of embodiments of the disclosure is to enable higher scanning rates by combining a rotating turret with an oscillating motion compensator—i.e., by separating rotating mass and oscillating (accelerated) mass. This arrangement reduces inertial forces, enabling operation at higher step rates, thereby increasing the scan rate (time to image the FOR). Those in the art familiar with periscopes will understand that periscope rotation causes the image to rotate with respect to the camera sensor by an angle equal to the periscope rotation. Accordingly, embodiments of the disclosed wide field scanner output a contiguous series of images, each of which is rotated by the step angle.

These and further and other objects and features of the invention are apparent in the disclosure, which includes the above and ongoing written specification, as well as the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art.

DETAILED DESCRIPTION

Figure 1A:
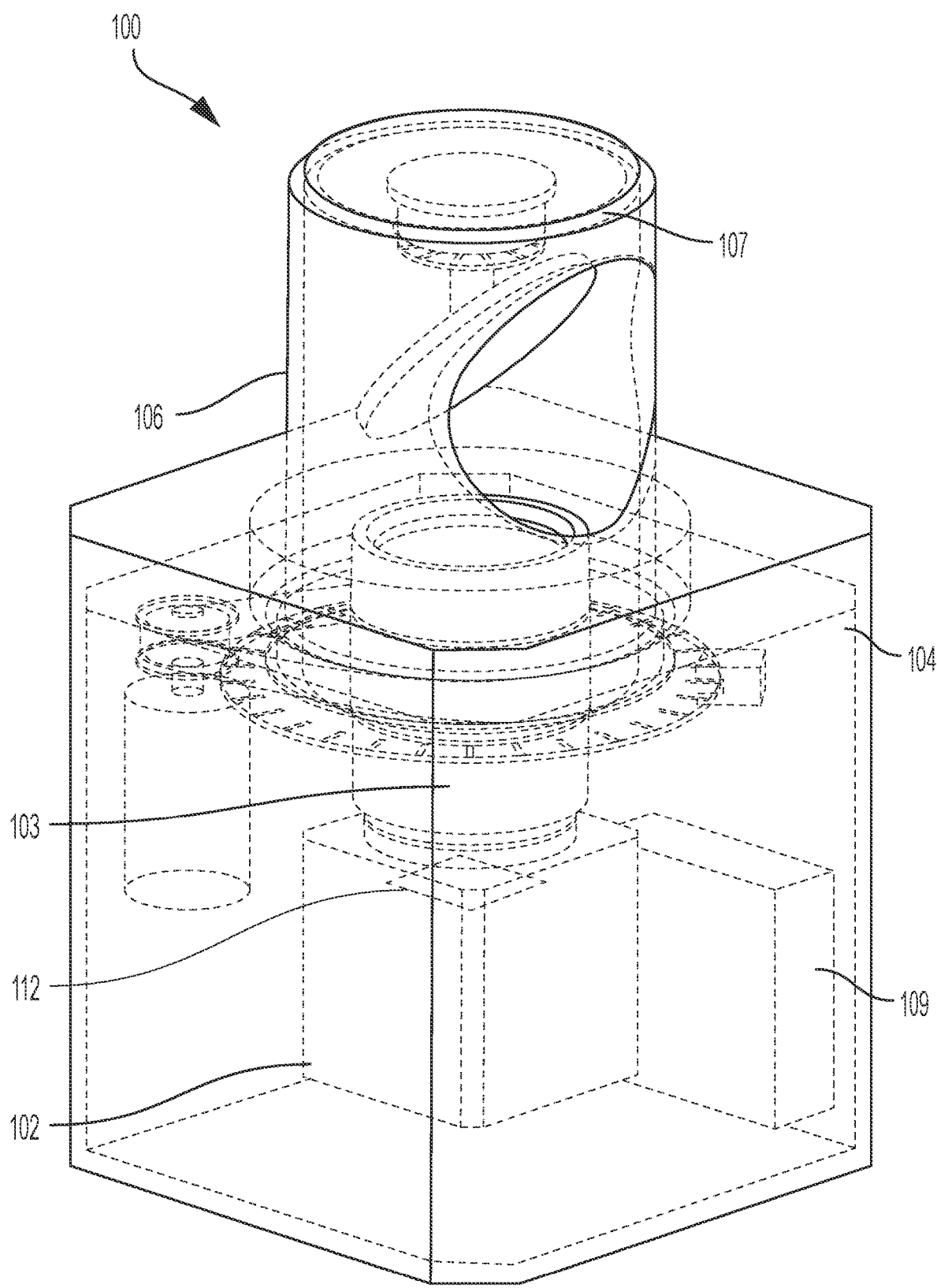
FIGS. 1A-1B are schematic diagrams illustrating partially transparent perspective views of a wide field optical sensor that includes a camera, a turret, a motion compensator, a system control and a base (FIG. 1A) and a light path within the sensor (FIG. 1B), according to an embodiment of the disclosure.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

As used herein, ranges are used herein in shorthand, so as to avoid having to list and describe each and every value within the range. Any appropriate value within the range can be selected, where appropriate, as the upper value, lower value, or the terminus of the range.

Unless indicated to the contrary, numerical parameters set forth herein are approximations that can vary depending upon the desired properties sought to be obtained. At the very least, and not as an attempt to limit the application of the doctrine of equivalents to the scope of any claims, each numerical parameter should be construed in light of the number of significant digits and ordinary rounding approaches.

The words "comprise", "comprises", and "comprising" are to be interpreted inclusively rather than exclusively. Likewise the terms "include", "including" and "or" should all be construed to be inclusive, unless such a construction is clearly prohibited from the context. The terms "comprising" or "including" are intended to include embodiments encompassed by the terms "consisting essentially of" and "consisting of". Similarly, the term "consisting essentially of" is intended to include embodiments encompassed by the term "consisting of". Although having distinct meanings, the terms "comprising", "having", "containing' and "consisting of" may be replaced with one another throughout the description of the invention.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Terms such as, among others, "about," "approximately," "approaching," or "substantially," mean within an acceptable error for a particular value or numeric indication as determined by one of ordinary skill in the art, which depends in part on how the value is measured or determined. The aforementioned terms, when used with reference to a particular non-zero value or numeric indication, are intended to mean plus or minus 10% of that referenced numeric indication. As an example, the term "about 4" would include a range of 3.6 to 4.4. All numbers expressing dimensions, velocity, and so forth used in the specification are to be understood as being modified in all instances by the term "about." Accordingly, unless indicated to the contrary, the numerical parameters set forth herein are approximations that can vary depending upon the desired properties sought to be obtained. At the very least, and not as an attempt to limit the application of the doctrine of equivalents to the scope of any claims, each numerical parameter should be construed in light of the number of significant digits and ordinary rounding approaches.

"Typically" or "optionally" means that the subsequently described event or circumstance may or may not occur, and that the description includes instances where said event or circumstance occurs and instances where it does not.

Wherever the phrase "for example," "such as," "including" and the like are used herein, the phrase "and without limitation" is understood to follow unless explicitly stated otherwise.

Generally, embodiments of the present disclosure are directed towards novel methods, devices, and systems for the rapid acquisition of high-resolution imagery over a large area of interest. One or more embodiments comprise: a base and camera; and a rotating turret with a motion compensating fold mirror, configured to direct scene energy to the camera (i.e., a periscope). During operation, the turret rotates continuously, and the fold mirror rotates back and forth with respect to the turret. The combined motions of the turret and fold mirror scan the camera FOV in discrete angular steps over the field of regard (i.e. step-stare). The camera acquires at least one image during a given stare period. This process is performed repeatedly, so as to rapidly acquire a substantially contiguous series of high-resolution images over a large scene area.

Known wide-field optical sensors include (1) wide field of view (WFOV) cameras, (2) scanning systems, (3) gimbal systems and (4) multi-camera systems. However, none of the above are able to simultaneously provide high resolution, wide coverage (FOR) and high scan rates. WFOV cameras provide wide coverage and persistence but lack the required angular resolution and sensitivity for long range optical sensing. Angular resolution is the ability of an optical system to resolve closely spaced scene features. The smallest resolvable angle for a diffraction limited imaging system, such as, for instance a lens or telescope, is approximately equal to the ratio of the wavelength of incoming light to the aperture diameter. WFOV lenses necessarily have short focal length and therefore relatively small entrance aperture diameters (e.g., a 5-mm entrance aperture diameter is typical). As a result, WFOV imaging systems have relatively poor angular resolution.

Sensitivity refers to the ability of an optical system to detect dim objects. One measure of sensitivity is the object intensity (W/sr) needed to yield a signal-to-noise ratio (SNR) of 3, for a given imaging scenario (range, atmospheric loss etc.). For unresolved objects (i.e., where the object is smaller than the scene area imaged by a pixel) the sensitivity is a function of the ratio of the received object flux ($W/cm^2$) to the background flux. The object flux is proportional to the entrance aperture area and the background flux is proportional to the product of aperture area and the solid angle subtended by each pixel. With WFOV optics, this ratio is unfavorable: The entrance aperture is small (less object flux), and the solid angle subtended by each pixel is large (increased background flux). In summary, WFOV systems have relatively poor sensitivity and angular resolution and are unsuitable for long range observing.

A typical scanning system employs a rotating mirror or other light directing means (e.g., prism, pellicle) to direct scene energy to a camera. During operation, the scanner sweeps the camera field of view (FOV) across the scene to acquire a series of images over the field of regard (FOR). In most applications, the scanner moves in discrete angular steps and is held stationary to minimize blur while the camera acquires images (i.e., step-stare operation). A key limitation of scanning systems is the scan rate, here defined as the reciprocal of the time needed to image the entire FOR. This rate is in turn limited by the step rate, here defined as the reciprocal of the time needed to accelerate, move, decelerate, and stabilize the scan mirror and associated mechanical components. Known strategies for increasing the step rate include (1) reducing accelerated mass (more specifically the moment of inertia of the mirror and associated components), (2) increasing the rigidity of accelerated components (smaller strain/deformation), (3) modifying damping and/or dissipation (reduced settling time), (4) increasing the performance of the motion control system, and (5) using low inertial/high rigidity components—e.g. beryllium. The latter is prohibitively expensive for many applications.

Scanning systems may operate in several modes, each of which is familiar to those of skill in the art, including, but not limited to: (1) a "step-stare mode" in which the system moves incrementally to acquire a series of images over the FOR or some portion of the FOR; (2) a "stare mode," in which the system is pointed at a fixed location in space and acquiring images of a fixed scene area; (3) a "track mode," in which the system follows a moving object; and (4) an "agile mode," which alternates between one or more of the aforementioned three modes. The scanner may also operate as part of a network, to increase the effective scan rate or to measure the object position (by triangulation).

Image blur is the result of motion between the image and focal plane array (image sensor) during exposure (image acquisition). In order to eliminate blur, the camera line of sight (LOS) must be stabilized to limit image motion. Stability requirements are driven by the angular extent of the pixels (i.e., the instantaneous field of view, or the IFOV) and the exposure time. In general, longer focal lengths (small IFOV) and dim scene conditions (longer exposures) impose more stringent stability requirements.

In the present disclosure, the term persistence refers to the time between successive images of a given scene area. With step-stare systems, persistence is related to the step rate, FOV and the size of the scene of interest (the FOR).

With respect to gimbal systems, a gimbal is a multi-axis, motion-controlled platform used to aim and stabilize one or more cameras with respect to a scene. When used for wide area optical sensing, the gimbal sweeps the camera field of view over the scene. Typically, the gimbal moves in discrete angular steps and is held stationary while the camera acquires at least one image. This process is repeated to acquire a contiguous set of images over the FOR—i.e., step stare operation.

Variants of the aforementioned method include rotating the gimbal yaw axis and back-scanning (or "nodding") to obtain a series of stationary images over a field of regard.

A key limitation of gimbal systems is their relatively low step rate, measured by the reciprocal of the time required to move and stabilize the gimbal payload (camera). With gimbal systems, the payload inertia (mass) is large, which necessarily limits the maximum step rate. Gimbal systems are also expensive and impose high system size, weight, and power requirements.

Therefore, there is no available technology that simultaneously provides high sensitivity, angular resolution, and high scanning rate. Known wide field imaging technologies are all in some way unsatisfactory. For instance, WFOV cameras have low resolution, NFOV cameras combined with scanners or gimbals have low scan rates, and multi-camera systems are impractically expensive.

As a result, there is an unmet need in the field for technology that can rapidly acquire high-resolution, low-latency imagery over a large field of regard. Non-limiting applications that could use such technology include defense companies and contractors, drone detection, and border surveillance. Embodiments of the disclosed invention include a wide field optical sensor that provides high-resolution imagery, enabling a user to observe even small, dim objects. Further, the sensor can capture images at a high enough rate to overcome the current limitation of scanning systems being too slow to detect objects or potential threats that appear only briefly and/or are moving at high speed.

Figure 1B:
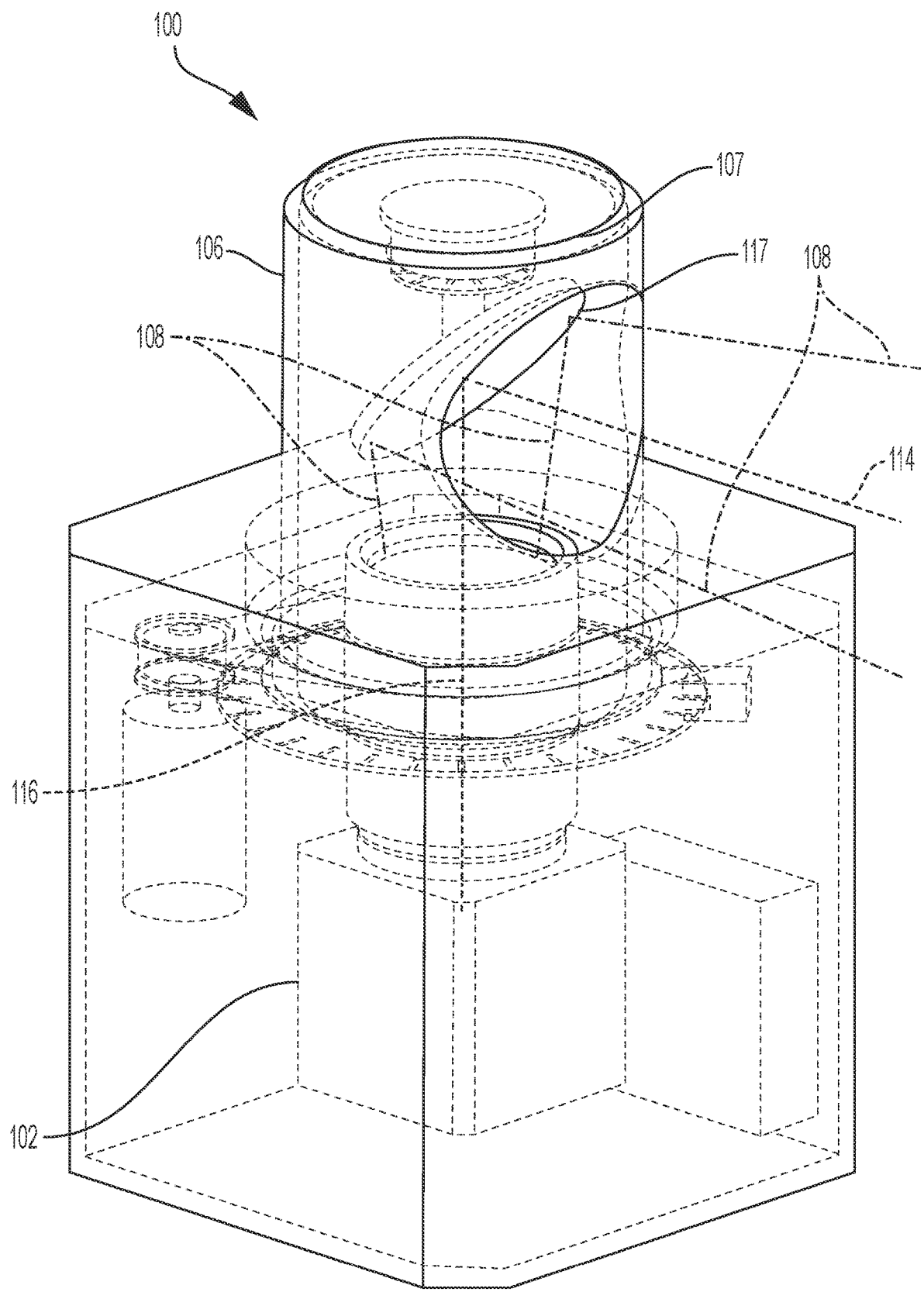

Turning now to FIGS. 1A-1B, a schematic diagram illustrating a perspective view of a wide field optical sensor is shown. In FIG. 1A, the wide field optical sensor 100 comprises a camera 102, a turret assembly 106, a motion compensator assembly 107, and a system control 109. The camera 102 and the system control 109 are housed inside a base 104. The camera, turret, and motion compensator are operably connected to the system control 109. Camera 102 further comprises a lens 103 and a focal plane array (FPA) 112 with pixels arranged in rows and columns. As seen in FIG. 1B, the motion compensator 107 further comprises a fold mirror 117, configured to direct optical energy from a scene to the camera 102 (e.g., a periscope). The camera includes an optical axis comprising an incident axis or line of sight (LOS) 114, and a camera axis 116. The camera forms an image with an angular extent defined by a field of view 108.

Figure 2:
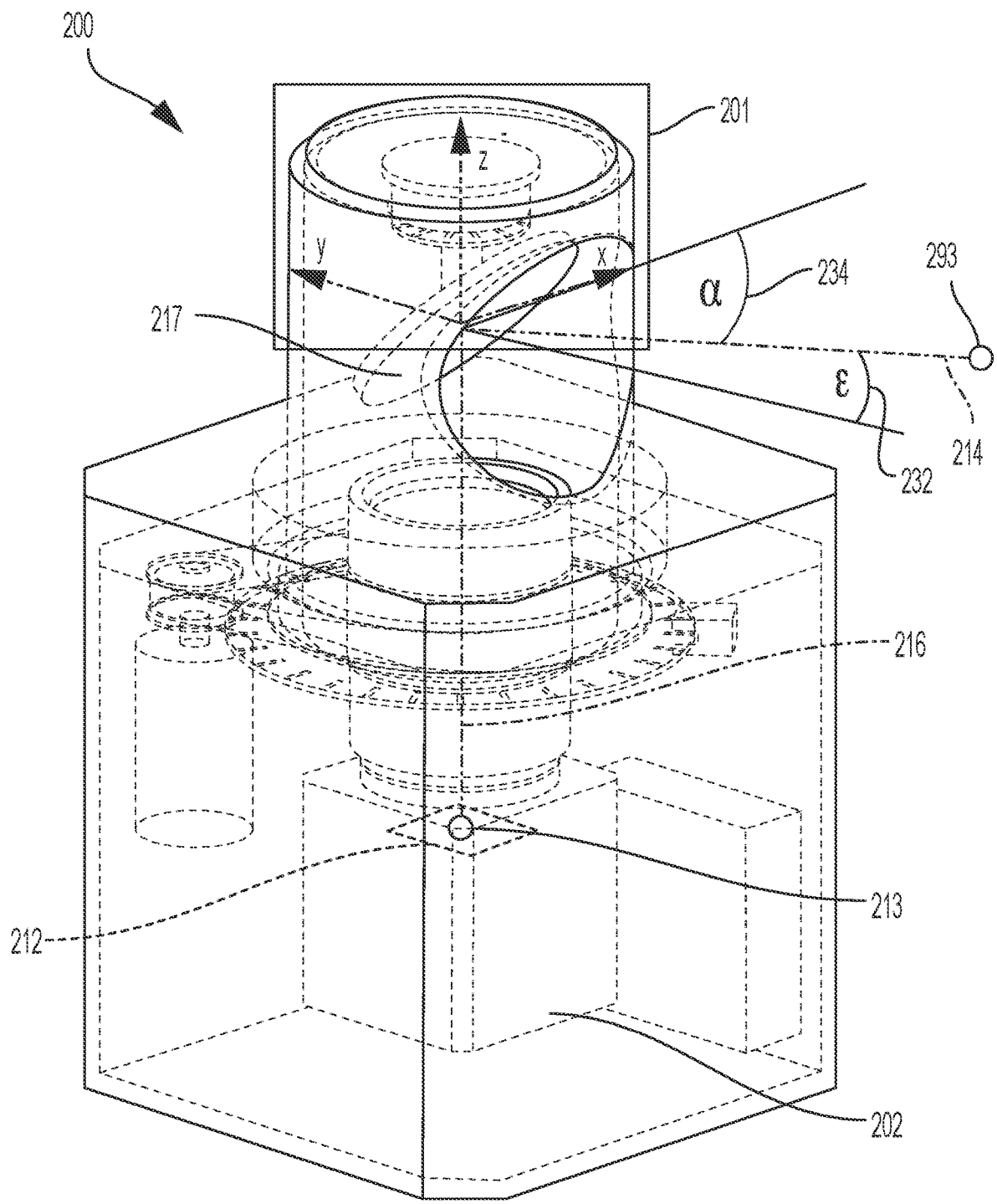
FIG. 2 is another schematic of a wide field optical sensor and a sensor frame, with the x-, y-, and z-axis, and an azimuthal angle α depicted, according to an embodiment of the present disclosure.

FIG. 2 illustrates a wide field optical sensor 200, which may be the wide field optical sensor shown in any of the other figures herein, with a sensor reference frame 201 having an x-, y-, and z-axis, and a camera 202. As shown, the z-axis is coaxial with camera axis 216. The x-axis is parallel to the pixel rows in the FPA 212. It will be understood that there are many ways known in the art to define a sensor reference frame, and that the sensor reference frame 201 defined herein is a non-limiting example given by way of illustration only. Angle α (234) represents an azimuthal angle between the camera line of sight (LOS) 214 and sensor frame 201. Angle ε (232) represents an elevation angle between the LOS 214 and reference frame 201. The intersection of FPA 212 and optical axis 216 defines a center field point 213. It should be appreciated that, in the present disclosure, the sensor pointing is defined by the angular coordinates of the line of sight 214 (i.e., angles α and ε).

Light from an object point 293 located on the line of sight will form an image at the center field point 213.

Figure 3:
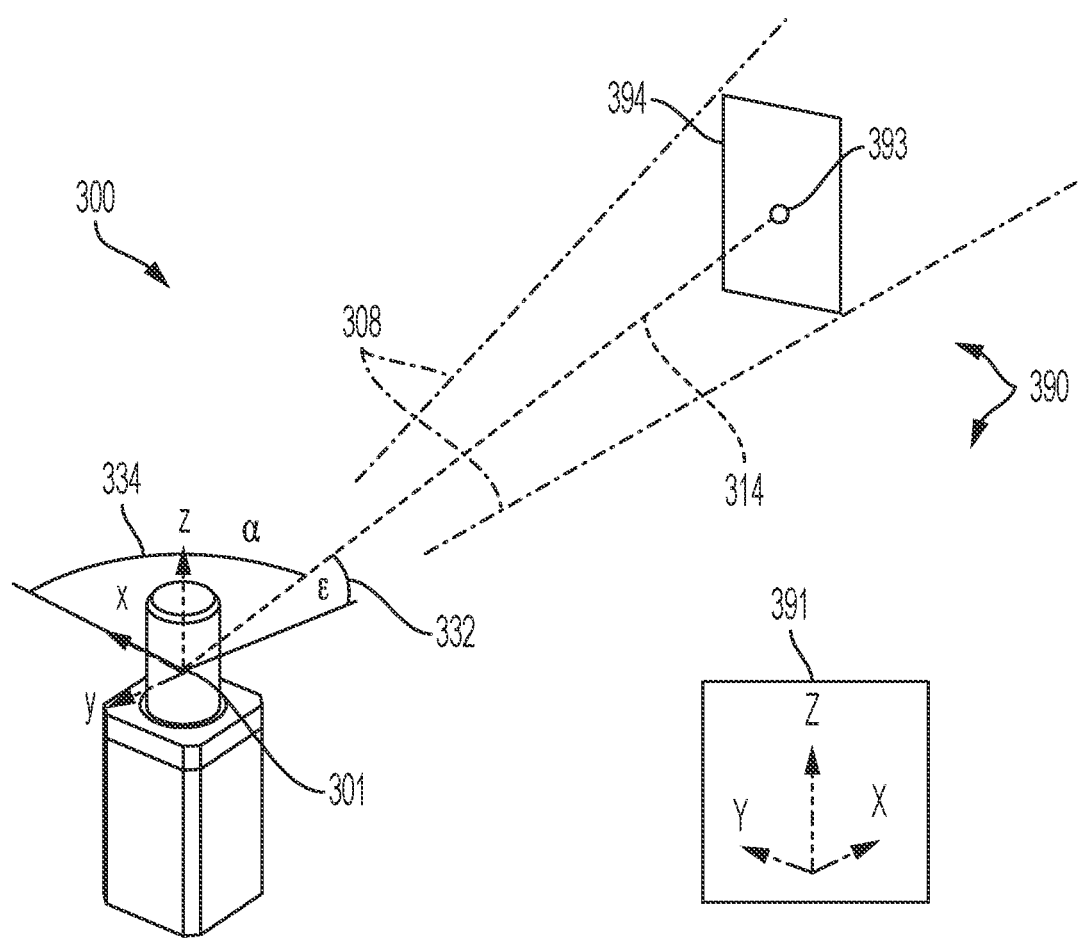
FIG. 3 is a further schematic diagram illustrating a partially transparent perspective view of a wide field optical sensor, a scene, a world frame with axes X-, Y- and Z-, and a field of view (FOV) within a scene imaged by a camera, according to an embodiment of the present disclosure.

FIG. 3 is an additional schematic diagram illustrating a perspective view of a wide field optical sensor 300, which may be the wide field optical sensor shown in any of the other figures herein. The wide field sensor is located in a scene 390. Also shown is a sensor reference frame 301. The wide field sensor images a scene area 394. The sensor pointing (angular coordinates of LOS 314) is defined by azimuthal angle α (334) and elevation angle ε (332). The angular extent of the imaged area is defined by the field of view FOV (308). The scene 390 includes a stationary world frame 391 with an X-, Y-, and Z-axis. By way of example, the world frame Z-axis points directly upward (is parallel with gravity) and the Y axis points north.

In at least one embodiment, the wide field optical sensor disclosed herein has several modes of operation that will be familiar to those of skill in the art, including, but not limited to: (1) a "step-stare mode," which continuously acquires images over some field of regard, (2) a "stare mode," which acquires images of the same, fixed region, (3) a tracking mode, where the sensor moves to follow an object, and (4) an "agile mode," which alternates between one or more of the aforementioned two modes. In stare mode, the fold mirror is stationary and the turret is rotated to an area of interest to acquire one or more images. In tracking mode, the fold mirror is again stationary, and the turret is rotated to keep the object of interest within the FOV. It should be appreciated that the disclosed wide field optical sensor can operate in any of the above described modes. It should further be appreciated that the wide field optical sensor may also function as part of a network of devices in order to obtain one or more types of data, including, but not limited to, location of an object of interest, the track of that object, objection motion and identifying characteristics of that object. The various aforementioned modes of operation will be discussed further with respect to the below figures.

Figure 4:
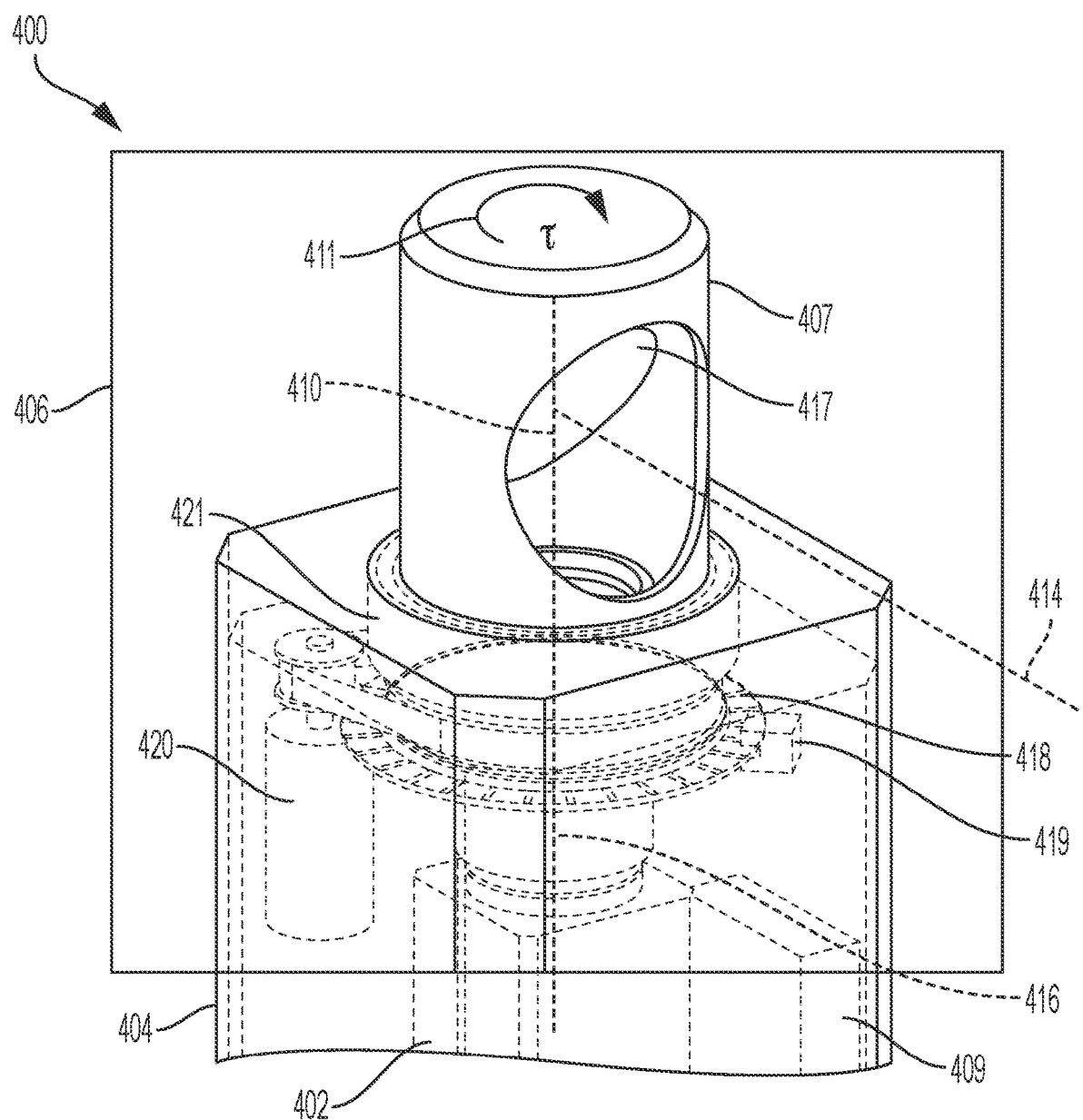
FIG. 4 is a partially transparent perspective view of a wide field optical sensor illustrating a turret in more detail, according to an embodiment of the present disclosure.

FIG. 4 shows a partially transparent perspective view of a portion of a wide field optical sensor 400, which may be the wide field optical sensor shown in any of the other figures herein. In particular, FIG. 4 further illustrates the turret assembly of the sensor. The sensor 400 comprises a camera 402, a turret 406, a motion compensator 407, and a system control 409. The camera and the system control are housed in a base 404. The turret 406 further comprises a bearing 421, a turret motion control 420, and an angular encoder, comprising a rotor 418 and a sensor 419. The turret and motion compensator form an assembly (i.e., 406 and 407 are attached). The turret-motion compensator assembly is configured to rotate about a turret axis 410. Turret rotation about axis 410 is depicted by curved arrow 411 and is denoted τ. The motion control 420 provides torque to rotate the turret or to hold the turret at a fixed angle with respect to the base. Motion compensator 407 further comprises a fold mirror 417 configured to direct energy from a scene (not shown) to the camera 402. The angular encoder measures angular displacement between the turret 406 and a stationary base 404 that houses the camera (i.e., measures angle τ). In at least one embodiment of the wide field optical sensor, the angular encoder includes at least one absolute angle reference, such as, for instance, a reference that defines a zero rotation or home position with respect to the stationary base.

In some embodiments, the disclosed scanner operates in step-stare mode. During "step-stare" operation the motion controller drives the turret at a substantially constant angular velocity. As used herein, the terms "angular velocity" and "angular rate" are used interchangeably and are measured in degrees per second, unless indicated otherwise. The aforementioned substantially constant angular velocity of the turret (e.g., rotation at 80 degrees per second) is denoted τ'. This is further illustrated in FIG. 6B. It should be appreciated that other turret motion profiles are compatible with the disclosed wide field optical sensor and with a step-stare operation. Purely as a non-limiting example, the turret angular rate may vary within a fold mirror period.

Figure 5:
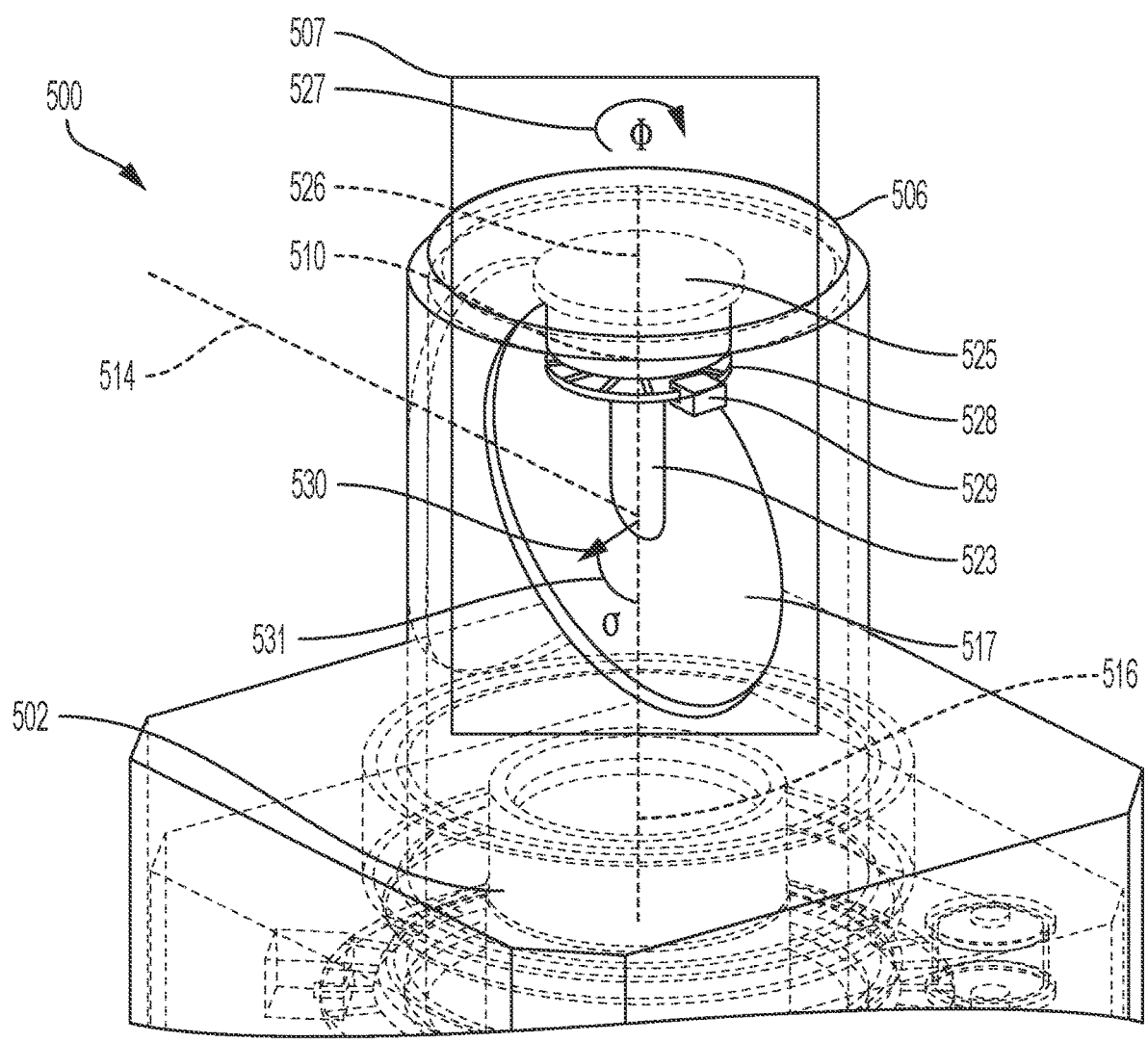
FIG. 5 is a partially transparent perspective view of a wide field optical sensor illustrating a motion compensator in more detail, according to an embodiment of the present disclosure.

Turning now to FIG. 5, a partially transparent perspective view of a portion of a wide field optical sensor 500 is shown, which may be the wide field optical sensor shown in any of the other figures herein. In particular, FIG. 5 further illustrates the motion compensator. Turret 506 and motion compensator 507 form an assembly (i.e., are attached). The turret-motion compensator assembly is configured to rotates about a turret axis 510. The motion compensator 507 further comprises a motion control 525, axle 523, fold mirror 517 and an angular encoder, comprising a rotor 528 and sensor 529. The fold mirror and axle are configured to rotate about a fold mirror axis 526. Fold mirror rotation, denoted φ, is depicted by curved arrow 527. More specifically, angle φ represents angular displacement with respect to the turret axis 526. Also shown is a normal 530, perpendicular to the reflective surface of fold mirror 517 and a fold mirror pitch angle 531 denoted σ. In some embodiments the fold mirror pitch angle σ is fixed, whereas in further embodiments the pitch angle may be changed using a suitable actuator. Thus, it should be appreciated that the sensor disclosed herein can utilize both a fixed pitch angle and a variable pitch angle. The motion controller 525 provides torque to rotate the fold mirror or to hold the fold mirror at a fixed angle with respect to the turret 506. The angular encoder measures angular displacement between the fold mirror 517 and the turret 506 (i.e., measures angle φ). In at least one embodiment the angular encoder includes at least one absolute angle reference, such as, for instance, a reference that defines a zero rotation or home position with respect to the turret.

When sensor 500 is operating in step-stare mode the motion controller actively controls the fold mirror motion to produce an oscillation cycle (rotate the fold mirror back and forth periodically). This is further illustrated in FIG. 7A.

Figure 6:
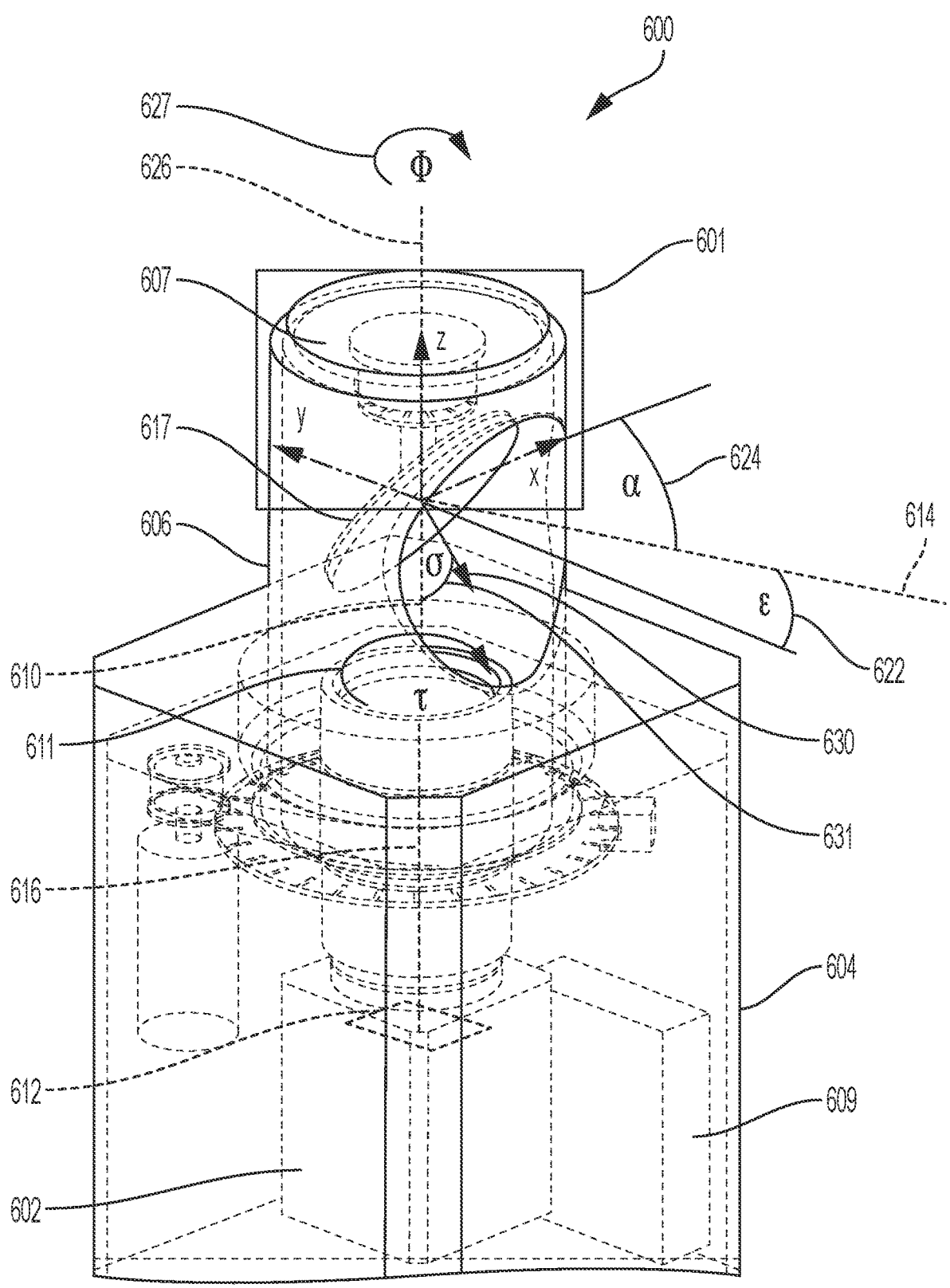
FIG. 6 is a schematic diagram illustrating a partially transparent perspective view of a wide field optical sensor showing a turret angle τ, fold mirror yaw and pitch angles (φ and σ) and a line of sight azimuthal angle α, according to an embodiment of the present disclosure.

FIG. 6 shows a partially transparent perspective view of a portion of a wide field optical sensor 600, which may be the wide field optical sensor shown in any of the other figures herein. In particular, FIG. 6 further illustrates various axes and related angles, including, for instance, the turret axis and turret angle, the motion compensator axis, and the fold mirror axis. The sensor 600 comprises a camera 602, a turret 606, a motion compensator 607 and a system control 609, housed in a base 604. The wide field sensor includes a sensor reference frame 601 having an x-, y-, and z-axis. The z-axis is coincident with camera axis 616 and the x-axis is parallel with the pixel rows in FPA 612. Turret 606 and motion compensator 607 form an assembly (i.e., 606 and 607 are attached). The turret-motion compensator assembly rotates about a turret axis 610. The turret angle rotation (measured with respect to frame 201) is represented by curved arrow 611 and is denoted τ. Motion compensator 607 further includes a fold mirror 617 and a fold mirror axis 626. The fold mirror is configured to rotate with respect to the turret about axis 626. The fold mirror rotation is represented by curved arrow 627 and is denoted φ. Also shown are a fold mirror normal 630 perpendicular to the fold mirror reflecting surface and a fold mirror pitch angle 631 denoted σ. Camera 602 views a scene (not shown) via fold mirror 617. The sensor pointing is defined by a line of sight LOS 614 with angular coordinates α (624) and ε (622). In some embodiments, the motion compensator and fold mirror axes are substantially coaxial with the optical axis and sensor frame z-axis.

For simplicity and clarity in further portions of the disclosure, the turret and fold mirror axes will be considered identical to the z-axis: turret rotation is about the z-axis, measured with respect to the sensor frame, and fold mirror rotation is about the z-axis, measured with respect to the turret. Further, the sensor reference frame and the world reference frame will be considered identical. It should be noted that the aforementioned are simplifications for purposes of teaching embodiments of the disclosure. For instance, one of skill in the art will recognize that identical axes is an ideal case, and that all optical systems are tolerant of small alignment errors (e.g., positional and angular errors). A skilled artisan will further recognize that embodiments of the disclosure can operate in situations where the sensor reference frame and world frame are not identical to each other (e.g., where the camera rotates and/or translates with respect to the world frame, such as, for instance, a wide field sensor mounted on a vehicle, ship, aircraft, and the like).

Figure 7A:
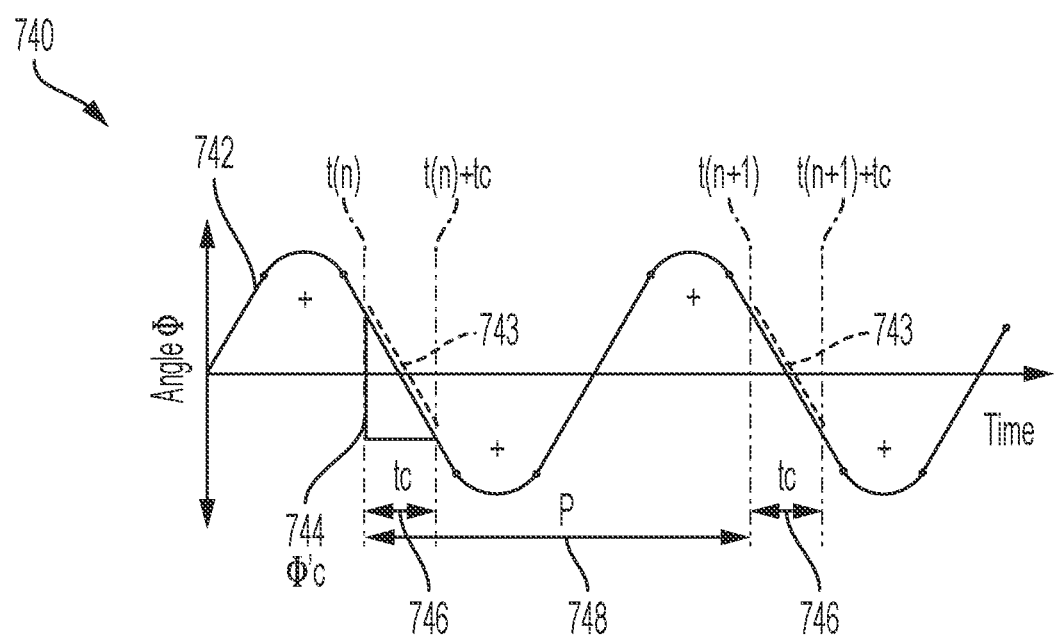
FIGS. 7A-7C are graphical representations of the fold mirror angle φ vs time (FIG. 7A), turret angle τ vs time (FIG. 7B) and line of sight azimuthal angle α vs time (FIG. 7C), according to an embodiment of the present disclosure.
Figure 7B:
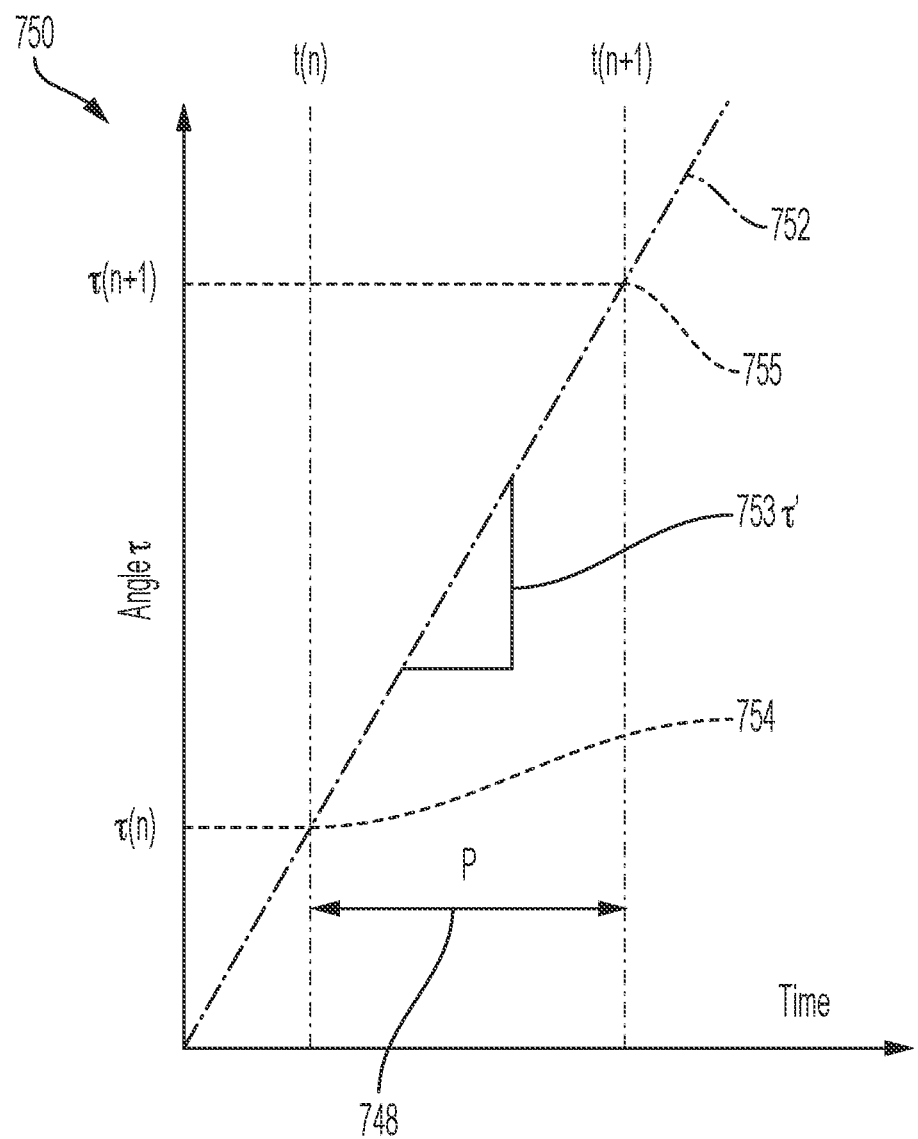
Figure 7C:
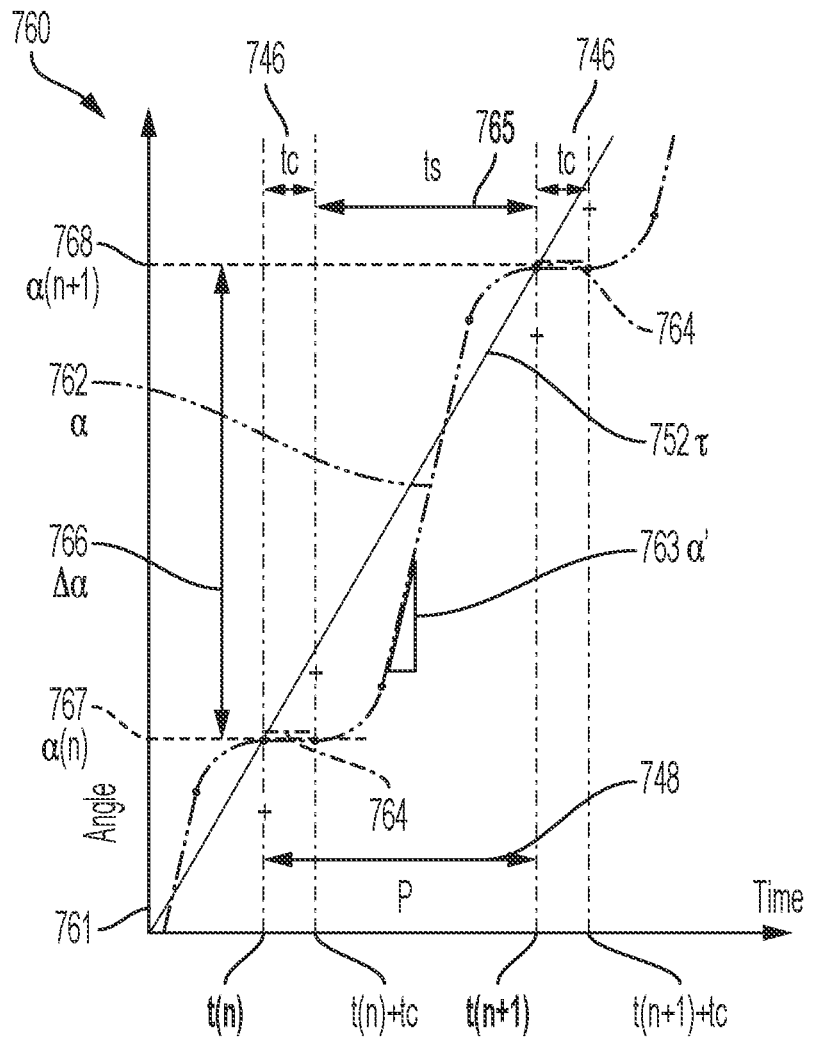

Turning now to FIGS. 7A-7C, graphical representations are shown of the fold mirror angle φ with respect to time (FIG. 7A), the turret angle τ with respect to time (FIG. 7B), and azimuth angle α with respect to time (FIG. 7C). It should be appreciated that the curves depicted are illustrative, non-limiting examples.

FIG. 7A shows a graphical representation of the fold mirror motion 740 while operating in step-stare mode. The vertical axis is the fold mirror angle φ (as shown in, for example, FIG. 5). The horizontal axis is time. Curve 742 represents the fold mirror motion profile (angle φ vs time). When operating in step-stare mode, the fold mirror oscillates (rotates back and forth periodically). The fold mirror motion profile is actively controlled by the motion controller (e.g. 525). During an oscillation cycle, the fold mirror rotates to some maximum positive angle (e.g., for instance, 10 degrees of amplitude), slows, stops, and then reverses direction and accelerates, eventually rotating to some maximum negative angle (e.g., for instance, 10 degrees of amplitude). This process is then repeated. Motion profile 742 includes a fold mirror period 748 denoted P. A compensation period 746, denoted tc occurs within each fold mirror cycle. During interval t(n) to t(n)+tc the fold mirror motion is substantially constant and is represented by line segment 743. The fold mirror angular velocity during the compensation period tc (i.e., the slope of line 743) is denoted φ'c (744). Similarly, at a later interval t(n+1) to t(n+1)+tc, the fold mirror angular velocity is again φ'c.

FIG. 7B shows a graphical representation of the turret motion 750 while operating in step-stare mode. The vertical axis is angle τ (as shown in, for example FIG. 4). The horizontal axis 729 is time. Fold mirror oscillation period P (748) is also shown. Line 752 represents the turret motion profile (angle τ vs time). The slope of curve 752 is the turret angular velocity 753, denoted τ'. Referring to FIGS. 7A and 7B, note that the turret angular velocity (τ') is substantially equal and opposite to the fold mirror angular velocity during the compensation period (φ'c)—i.e. φ'c+τ' is approximately equal to zero (e.g., preferably −0.5 to 0.5 degrees per second or less, more preferably −0.1 to 0.1 degrees per second or less, and most preferably −0.01 to 0.01 degrees per second or less). The turret phase is also illustrated: at time t(n) 754 the turret angle is τ(n), at time t(n+1) 755, the turret angle is τ(n+1).

FIG. 7C shows a graphical representation of the line of sight (LOS) 760 vs. time while operating in step-stare mode. Vertical axis 761 is angle and the horizontal axis is time. Line 752 is the turret motion profile (angle τ with respect to time). Curve 762 represents the azimuthal component of the camera line of sight with respect to time (angle α with respect to time). Fold mirror oscillation period P (748), compensation period tc (746) and times t(n), t(n+1) are also shown. Curve 762 represents the combined motion (i.e. the sum) of the turret and fold mirror motion profiles. The angular velocity of the LOS azimuth α is the slope of curve 762, this is represented by triangle 763, denoted α'. Referring back to FIG. 7A, during time interval t(n) to t(n)+tc (i.e. during a compensation period tc) the fold mirror angular velocity φ'c is substantially equal and opposite to the turret velocity τ' and the sum (τ'+φ'c) is substantially zero (e.g., preferably −0.5 to 0.5 degrees per second or less, more preferably −0.1 to 0.1 degrees per second or less, and most preferably −0.01 to 0.01 degrees per second or less). This situation is represented by horizontal line segment 764. During time tc, the LOS is stationary and the scene, as viewed by the camera, appears motionless. During interval 765 denoted 'ts' the combined motions of the turret and fold mirror cause the LOS azimuthal angle to increase by a step angle 766 denoted Δα. This process is repeated in the following mirror cycle, starting at time t(n+1).

During interval t(n) to t(n)+tc the azimuth angle is α(n) and the angular velocity (α') is zero (i.e., the slope of curve 762 is zero) The scene as viewed by the camera appears motionless. The camera may acquire one or more images of a scene area with azimuthal coordinate α(n). The time interval t(n) to t(n)+tc corresponds to a 'stare' period. During interval t(n)+tc to t(n+1), the LOS increases by step angle Δα. The azimuth angle (LOS) increases from a(n) to a(n+1). The time interval t(n)+tc to t(n+1) corresponds to a step period.

Figure 8:
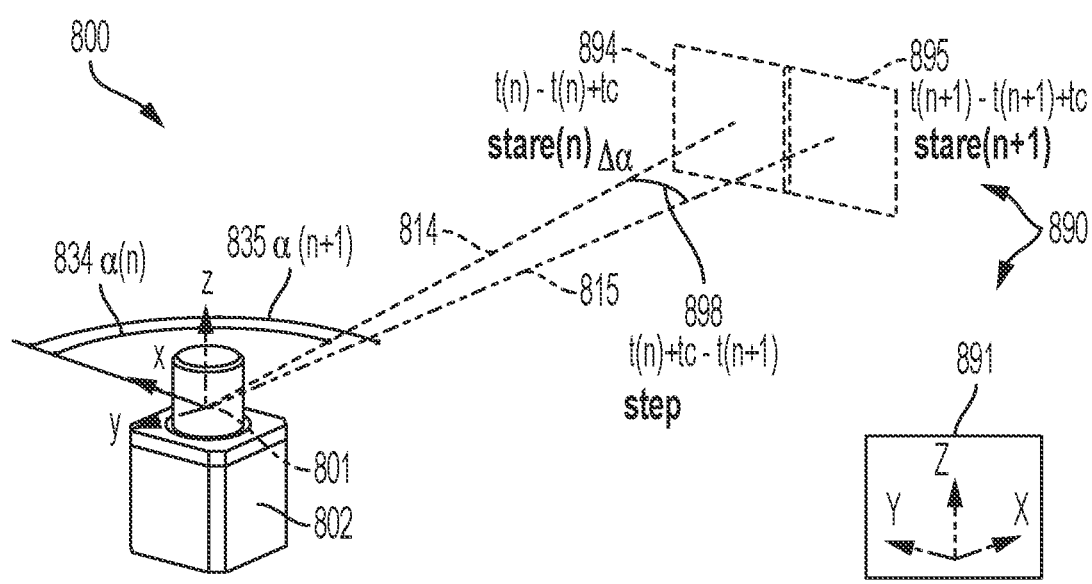
FIG. 8 is a perspective view of a wide field sensor operating in step-stare mode and a scene, according to an embodiment of the present disclosure.

FIG. 8 shows a perspective view of a wide field optical sensor 800, which may be the wide field optical sensor shown in any of the other figures herein. Sensor 800 is located in a scene 890 and is configured to operate in step-stare mode. Sensor reference frame 801 and world reference frame 891 are also shown. FIG. 8 illustrates the wide field sensor operation during three time intervals: (1) a stare interval t(n)–t(n)+tc denoted 'stare(n)', during which the sensor images a scene area 894 with LOS 814 and azimuth angle α(n) 834, (2) a step interval t(n)+tc–t(n+1) denoted 'step', during which the azimuth angle increases by step angle Δα (898) and (3) another stare interval t(n+1)–t(n+1)+tc denoted 'stare(n+1)', during which the sensor images a scene area 895 with LOS 815 and azimuth angle α(n+1) 835.

Referring in particular to FIGS. 7C and 8: (1) during time interval t(n)–t(n)+tc denoted 'stare(n)', the azimuth angle α(n) (e.g., 834) is constant and the azimuth angular velocity α' is zero (as depicted by e.g., the slope of line 764). The scene as viewed by the camera appears motionless. Camera 802 acquires one or more images of scene area 894; (2) During interval t(n)+tc–t(n+1) denoted 'step' the azimuth angle increases by a step angle Δα (as shown by e.g., 898, 766). The azimuth angle increases from α(n) (767, 834) to α(n+1) (768, 835); (3) during interval t(n+1)–t(n+1)+tc denoted 'stare(n+1)' the azimuth angle α(n+1) (e.g., 835) is constant and the azimuth angular velocity α' is zero (as depicted by e.g., the slope of line 764). The scene as viewed by the camera appears motionless. Camera 802 acquires one or more images of scene area 895.

One of skill in the art will understand that the defined compensation period (e.g. period 746 illustrated in FIG. 7C) is given by way of illustration to teach embodiments of the disclosure. Those of skill in the art will understand: (1) that it is possible to practice embodiments with a range of compensation periods, e.g., the compensation period can be longer or shorter in duration, (2) that the combined motions of the turret and fold mirror (i.e., τ'+φ'c) can be greater than zero, e.g., embodiments of the disclosed wide field imager can tolerate some image motion or blur during camera exposure, and (3) mitigation techniques can be used to compensate image motion during camera exposure, for example by acquiring a series of short exposures and using a shift and stack algorithm to construct at least one image, during a stare period.

As stated previously herein, the fold mirror of the wide field optical sensor may have a pitch angle that is either fixed or variable. The angle can be fixed in order to scan a constant elevation or, alternatively, it can be actively controlled to increase the vertical extent of the sweep area. Non-limiting examples are described below with particular reference to FIGS. 9A and 9B.

Figure 9A:
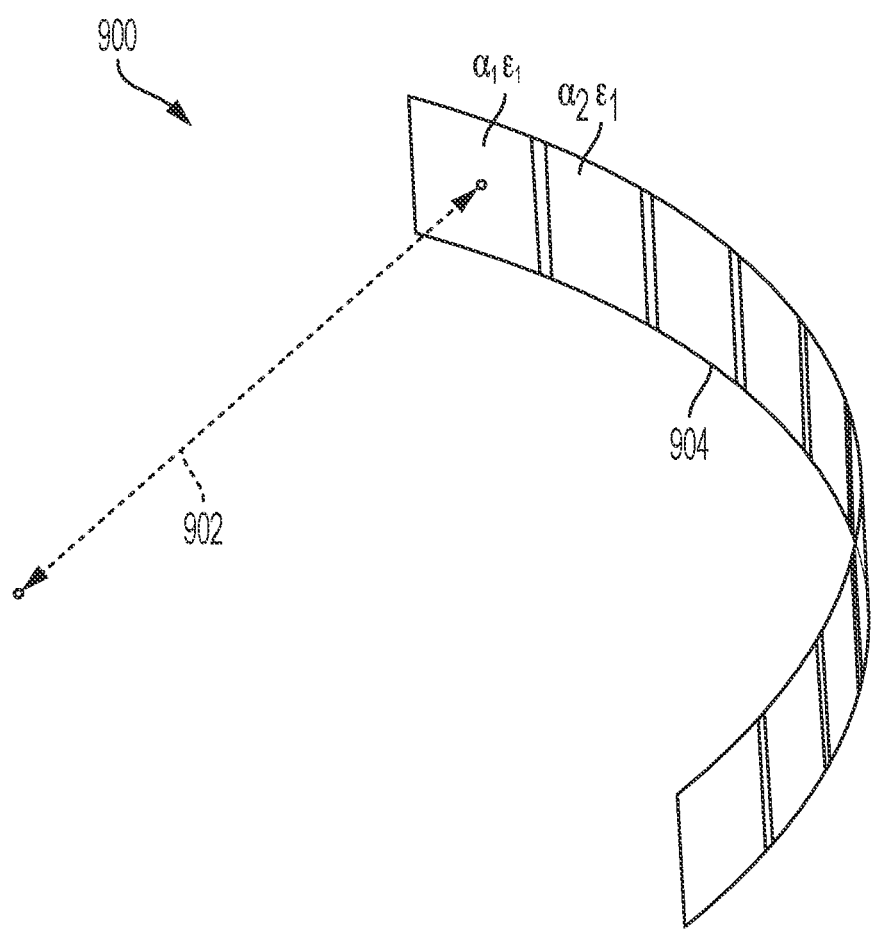
FIGS. 9A-9B are perspective views of a wide field optical sensor operating in step-stare mode illustrating scanning with fixed elevation angle (FIG. 9A) and with variable elevation angle (FIG. 9B), according to an embodiment of the present disclosure.

FIG. 9A illustrates a scenario 900 in which the fold mirror pitch angle is fixed. For instance, the angle could be fixed at 45 degrees, in which case the line of sight (LOS) elevation would be zero degrees and the scanner would acquire a series of images centered on the horizon. Similarly, the pitch angle could be fixed at, for example, 50 degrees so that the LOS has an elevation angle of 10 degrees above the horizon. In the fixed pitch angle scenario 900, the elevation of LOS 902 is likewise fixed and non-variable. As the sensor (not shown) sweeps across an area, a series of images 904 is generated with fixed elevation (e.g., a series of images with angular coordinates α1ε1, α2ε1, and so on.

Figure 9B:
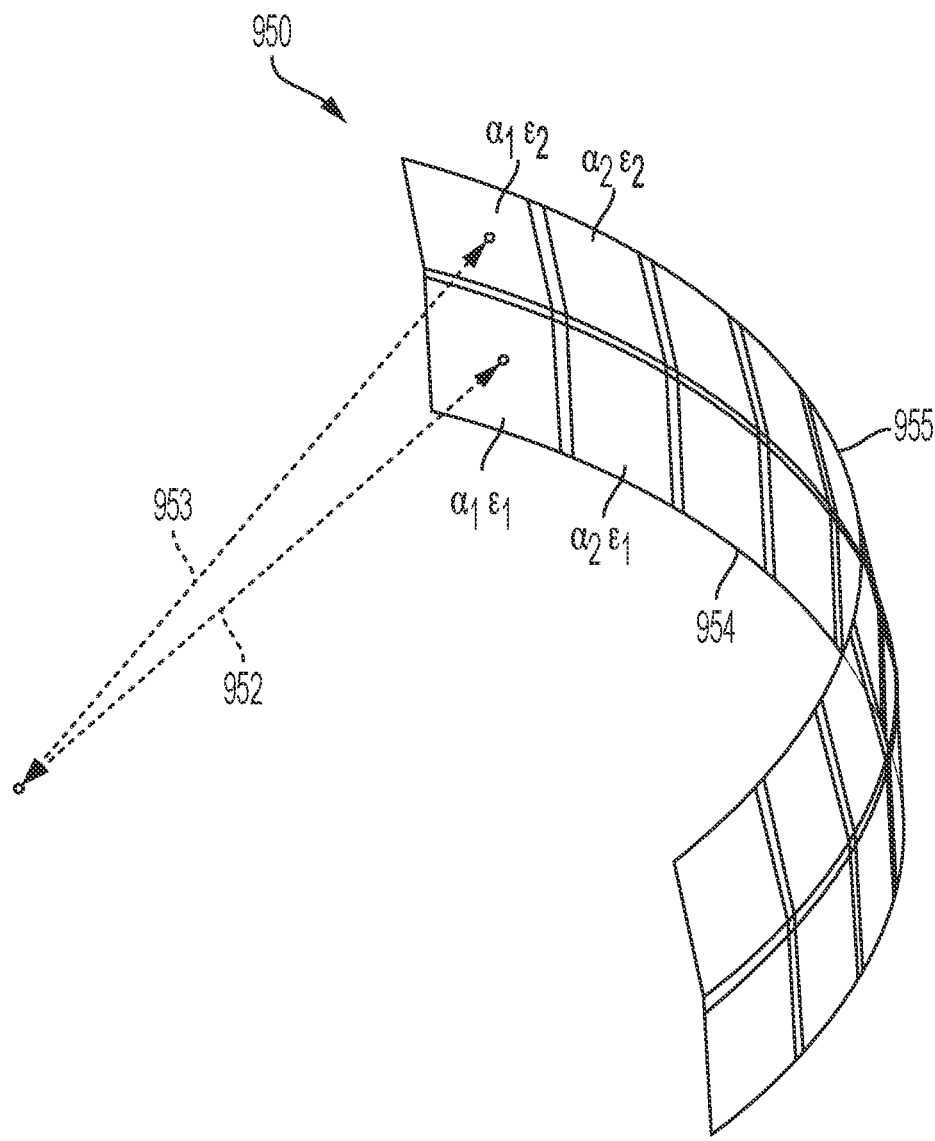

FIG. 9B illustrates a scenario 950 in which the fold mirror pitch angle is variable and can be adjusted or controlled. Such adjustment or control may be achieved manually or actively by an actuator or other mechanism known in the art to control pitch angle. In this scenario 950, the LOS can first be LOS 952, resulting in the acquisition of a first series of images 954 (e.g., a series of images with angular coordinates α1ε1, α2ε1, α3ε1, . . . ). The pitch angle can then be increased to result in a LOS 953, which causes the acquisition of a second series of images 955 (e.g., α1ε2, α2ε2, α3ε2, . . . ).

Figure 10:
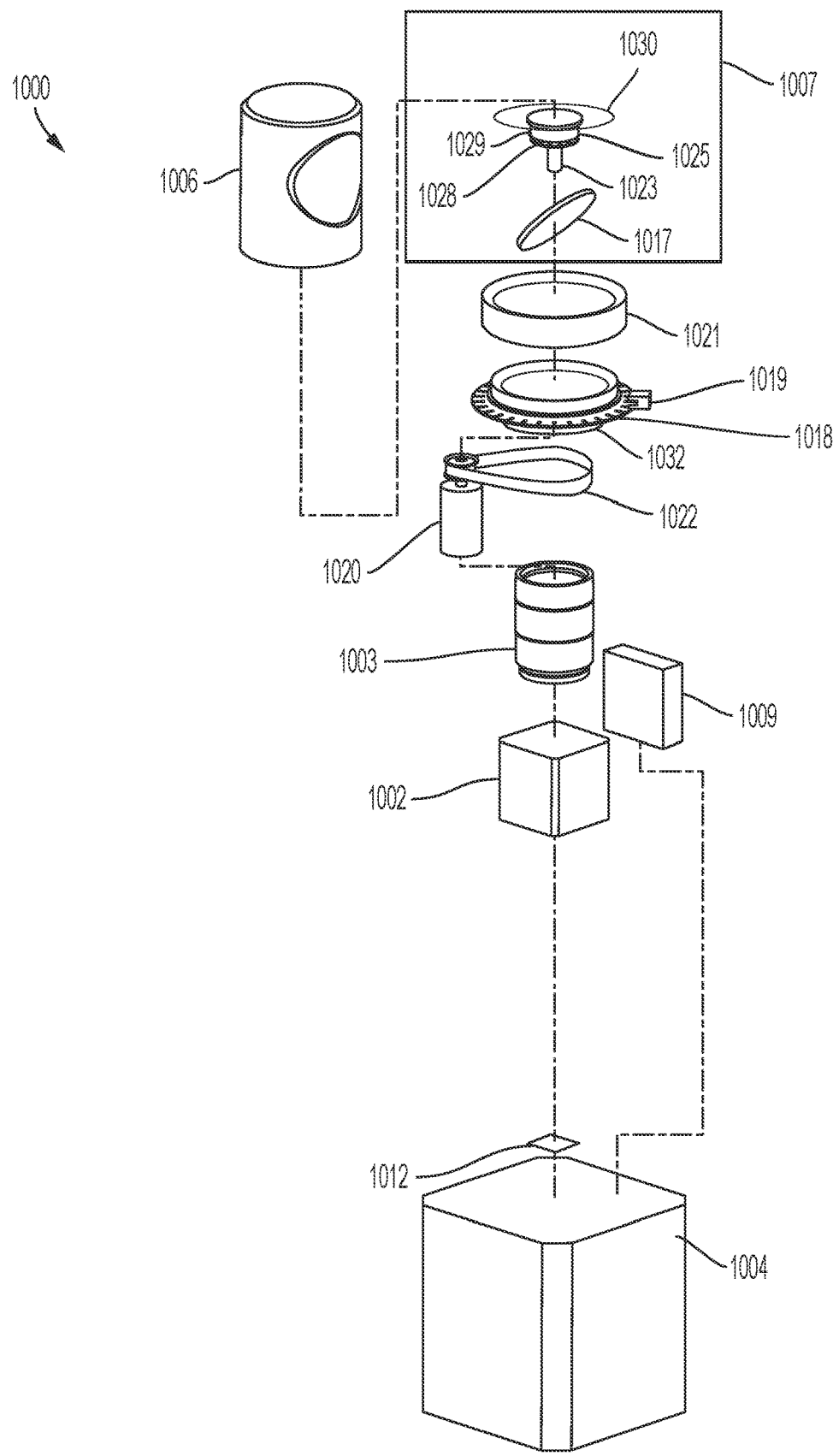
FIG. 10 is an exploded view of a wide field optical sensor, according to an embodiment of the present disclosure.

Turning now to FIG. 10, an exploded view of a wide field optical sensor 1000 is shown, which may be one or more of the wide field optical sensors disclosed above herein. The sensor 1000 comprises a camera 1002, a turret assembly 1006, a motion compensator assembly 1007, and a system control 1009. The camera 1002 and the system control 1009 are housed inside a base 1004. The camera, turret, and motion compensator are operably connected to the system control 1009. Camera 1002 further comprises a lens 1003 and a focal plane array (FPA) 1012 with pixels arranged in rows and columns. The motion compensator assembly 1007 comprises the following internal components: (1) a fold mirror 1017, configured to direct optical energy from a scene to the camera 1002 (e.g., a periscope), (2) a motion controller 1025, (3) an axle 1023, and (4) an angular encoder, comprising a rotor 1028 and sensor 1029. Further, there is an attachment 1030 for attaching one or more portions of the motion compensator assembly 1007 to, e.g., one or more portions of the turret assembly 1006. The turret assembly 1006 further comprises a hollow bearing 1021, a turret motion control 1020, and a hollow angular encoder, comprising a rotor 1018 and a sensor 1019. The angular encoder further comprises a protrusion 1032 configured to fit within, and/or be driven by, the drive belt portion 1022 of turret motion control 1020.

Blur (e.g., caused by image motion in pixels during camera exposure) can be expressed as the product of the angular velocity ($\phi'c+\tau'$), the exposure time, and the image sampling (e.g., number of pixels per degree field of view, determined by the focal length and pixel size). Decreasing one or more of these (e.g., exposure time and/or the image sampling) will relax the motion compensation requirements (e.g., permit operation with higher angular velocity during the compensation period). Further, the exposure time is subject to a tradeoff between blur and image noise; that is, reducing the exposure time reduces blur but also increases image noise. One of skill in the art will appreciate that the maximum tolerable angular velocity during the compensation period (e.g., $\phi'c+\tau'$ in FIGS. 7A and 7B) depends on several interrelated factors. These factors include, but are not limited to, the following: (1) the focal length: reducing the focal length reduces the image sampling (e.g., number of pixels per degree field of view), thereby relaxing the motion compensation requirement, (2) the numerical aperture (f/#): employing faster optics (e.g., a lower f/#) permits shorter exposure times, thereby relaxing the motion compensation requirement, (3) exposure time, which is subject to a tradeoff between blur and image noise (that is, reducing the exposure time reduces blur but increases image noise), (4) scene brightness: a brighter and/or more well-lit scene permits shorter exposure times, thereby relaxing the motion compensation requirement, (5) relaxing one or more of the image quality requirements (e.g., increasing blur and/or decreasing SNR), (6) the camera specifications: for instance, pixel size or noise performance, and (7) post-processing: for instance, acquiring several short exposures and using a shift and stack algorithm to construct a single frame.

One of skill in the art will appreciate that the motion of the fold mirror and the motion of the turret will not precisely cancel each other, and there will be some residual motion of the image with respect to the camera sensor. If this is not corrected or mitigated, image blur and a loss of information may result. Therefore, in at least one embodiment of the disclosure, mitigation methods may be used to improve image quality. Such methods include, but are not limited to, one or more of the following: First, active control may be used, in which the angular velocities of both the turret and the fold mirror are measured and used to actively control relative motion. As a non-limiting example, the turret angular velocity may be held substantially constant and the fold mirror motion profile actively controlled so that during a compensation period the fold mirror angular velocity is substantially equal and opposite to the turret velocity.

Second, the camera may be instructed to acquire a series of short exposure images and the angular offset for each image can be derived from the angular encoders to perform a "shift and stack" correction in post-processing. This process, which is known in the art, yields a single image with higher SNR than the short exposure images.

Third, embodiments of the sensor disclosed herein comprise improvements in the design of the turret and motion compensator. Such improvements include but are not limited to: increasing the inertia of the turret, including a counter-rotating mass to reduce forces between the motion compensator and the turret, including features that minimize wind disturbance, stabilizing the wide-field optical sensor with respect to the world frame (when used e.g. on a ship), and using low mass, high rigidity components for the fold mirror.

Embodiments of the disclosure therefore enable high speed step-stare by reducing accelerated mass via separating the turret and compensator. In other words, by separating constant velocity mass (turret) from accelerated mass (e.g., oscillating fold mirror). Such separation reduces the mass of accelerated components (e.g., the fold mirror), this reduces inertial forces, and allows operation at higher accelerations. This translates to higher stepping rates and therefore higher scan rates. It should be appreciated that the step-rate can be further increased in various embodiments by optimizing the motion compensator (e.g., optimizing the geometry or materials thereof) to achieve high stiffness and low moment of inertia.

One benefit of at least one embodiment disclosed herein is the enablement of step-stare operation by combining two smooth motion profiles, namely the rotation of the turret and the oscillation of the motion compensator. The aforementioned reduces inertial forces and enables operation at higher step rates when compared to optical sensors currently known in the art.

It should be appreciated that embodiments of the disclosed wide field optical sensor can be operated in a "relay" configuration, in which the camera and the scanner are on the same plane. Although such a configuration may provide less scan range (e.g., maximum of 100 degrees), one advantage of this configuration is that the image remains upright.

It should further be appreciated that embodiments of the disclosure provide several advantages over currently available technology. First, the invention in various embodiments has a higher step rate (time between successive images) and scan rate (time to image the FOR). The step rate is largely determined by the inertia of the accelerated components. The invention in various embodiments employs a novel scan mirror design that minimizes the accelerated mass, thereby enabling operation at higher step rates. Second, embodiments of the optical sensor disclosed herein have a higher pointing accuracy than currently-available technology (e.g., scanners, gimbals). This is made possible by the orthogonality and rigidity of the disclosed scanner (single axis, relatively simple construction, compact) and by the use of rotating elements that allow the use of high accuracy encoders. The latter is not possible with scanners that employ flexures. By comparison, gimbals have much greater complexity (typically a stabilized 'floating' bench within a rotated frame within a rotated frame), lower dimensional accuracy (orthogonality, rigidity), and lower angular measurement accuracy (for the inner 'bench' in particular).

These and other objectives and features of the invention are apparent in the disclosure, which includes the above and ongoing written specification.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

I claim:

1. A wide field optical sensor comprising:
   a camera comprising a lens and a focal plane array (FPA) with pixels arranged in rows and columns;
   an assembly comprising a turret attached to a motion compensator, the motion compensator comprising a fold mirror configured to direct optical energy to the camera;
   a motion controller configured to oscillate the fold mirror between a maximum positive angle and a maximum negative angle; and
   a system controller,
   wherein the turret comprises a turret motion controller and an angular encoder,
   wherein the camera, the turret, and the motion compensator are each operably connected to the system control,
   wherein the wide field optical sensor is configured to operate in a first mode in which (i) the wide field optical sensor moves to follow a moving object in a field of regard, and (ii) the fold mirror is stationary and the turret is rotated to keep the moving object within a field of view.

2. The wide field optical sensor of claim 1, wherein the turret motion controller is configured to provide torque to rotate the turret and/or to hold the turret at a fixed angle with respect to the camera, and wherein the angular encoder is configured to measure angular displacement between the turret and the camera.

3. The wide field optical sensor of claim 2, wherein the angular encoder includes at least one absolute angle reference.

4. The wide field optical sensor of claim 1, wherein the turret motion controller is configured to drive the turret at a constant angular velocity.

5. The wide field optical sensor of claim 1, wherein the fold mirror is configured to rotate about a fold mirror axis, wherein the rotation represents an angular displacement with respect to the turret axis.

6. The wide field optical sensor of claim 5, wherein the fold mirror has a fold mirror pitch angle that is alterable using one or more actuators.

7. The wide field optical sensor of claim 1, further comprising:
   a sensor reference frame having an X-axis parallel with the FPA pixel rows, a Y-axis, and a Z-axis extending vertically through a center of the wide field optical sensor,
   wherein the turret is configured to rotate about the Z-axis measured with respect to the sensor reference frame, and
   wherein the motion compensator comprises a fold mirror configured to rotate about the Z-axis measured with respect to the turret.

8. The wide field optical sensor of claim 7, wherein the motion compensator and the fold mirror axis are coaxial with the Z-axis.

9. The wide field optical sensor of claim 1, wherein the wide field optical sensor is further configured to operate in:
   a second mode in which the wide field optical sensor continuously acquires images over the field of regard, and
   a third mode in which the wide field optical sensor acquires images of a fixed region within the field of regard.

10. The wide field optical sensor of claim 9, wherein, in the second mode, the turret motion controller drives the turret at a constant angular velocity.

11. The wide field optical sensor of claim 9, wherein, in the third mode, the fold mirror is stationary and the turret is rotated to the fixed region.

12. A wide field optical sensor comprising:
    a camera having an optical axis; and
    an assembly comprising a turret and a motion compensator, wherein the motion compensator comprises a fold mirror configured to convey optical energy into the camera and to rotate about a fold mirror axis,
    wherein the fold mirror is configured in at least a first mode of operation to have a first rotational motion about the fold mirror axis and a second, oscillating rotational motion about the fold mirror axis,
    wherein the first and second rotational motions combine to produce an overall rotational motion of the fold mirror with respect to the camera,
    wherein, at regular periods, the first and second rotational motions offset one another, whereby the camera can capture an image during the regular periods with reduced motion blur, and
    wherein the fold mirror is configured in at least a second mode of operation to be stationary while the turret is rotated to keep a moving object within a field of view.

13. The wide field optical sensor of claim 12, wherein the turret provides the first rotational motion at a constant rate.

14. The wide field optical sensor of claim 12, further comprising a motion controller configured to control the fold mirror's second rotational motion at a variable rate.

15. The wide field optical sensor of claim 12, wherein the turret comprises a turret motion controller and a turret angular encoder, wherein the turret angular encoder measures angular motion between the turret and the camera.

16. The wide field optical sensor of claim 12, wherein the motion compensator further comprises an angular encoder configured to measure angular motion between the fold mirror and the turret.

17. A wide field optical sensor comprising:
    a camera having an optical axis;
    a turret connected to the camera and configured to rotate with respect to the camera about the optical axis; and
    a fold mirror positioned within the turret and configured to convey light from a scene into the camera and to rotate both with the turret and independently of the turret about the optical axis of the camera;
    wherein the fold mirror comprises a fold mirror motion controller that controls the fold mirror's rotation independent of the turret and an angular encoder configured to measure angular motion between the fold mirror and the turret;
    wherein the turret comprises a turret motion controller and a turret angular encoder, the turret motion controller being configured to control the turret's rotation with respect to the camera about the optical axis and the turret angular encoder being configured to measure angular motion between the turret and the camera;
    wherein, in at least one mode of operation, the turret is configured to rotate about the optical axis at a constant rate while the fold mirror rotates in an oscillatory manner with respect to the turret, such that, with each fold mirror cycle, the combined motions of the turret and fold mirror cause the fold mirror to rotate incrementally with respect to the camera, and wherein the camera acquires at least one image of the scene during each incremental rotation, thereby acquiring a series of images of the scene.

18. The wide field optical sensor of claim 17, further comprising:

one or more actuators configured to vary a pitch angle of the fold mirror.

* * * * *